Oct. 21, 1924.
F. J. HEKRDLE
MATCH BOX
Filed April 3, 1922    3 Sheets-Sheet 1
1,512,464
Fig. 1.
Fig. 2.
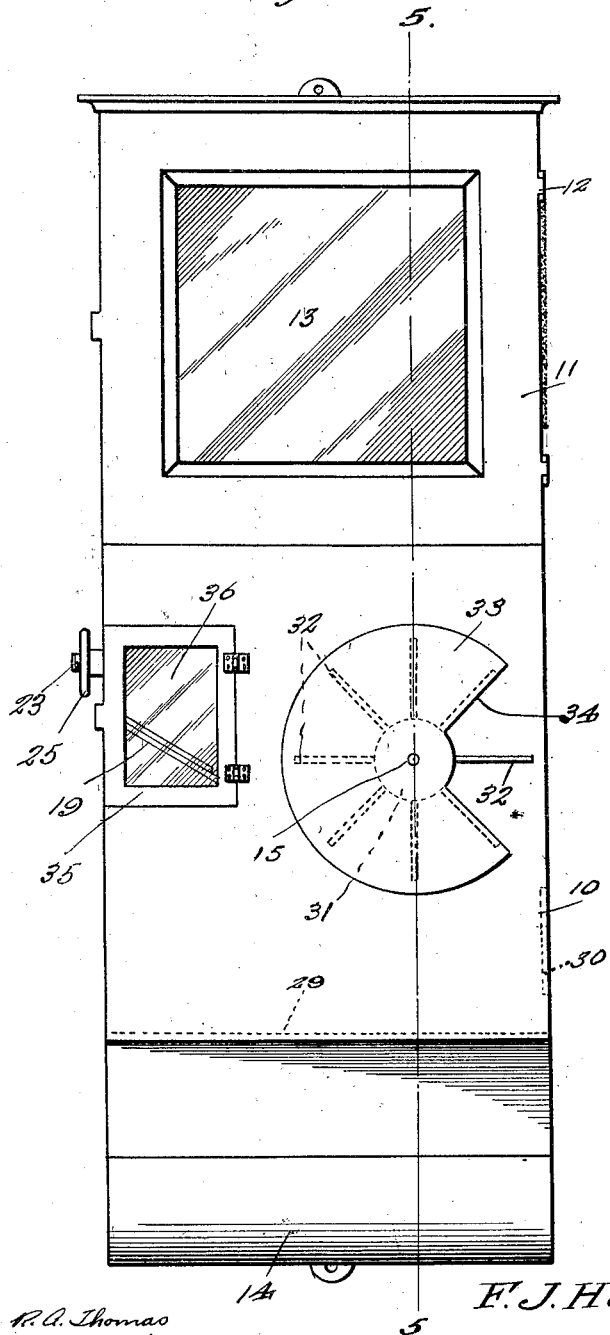
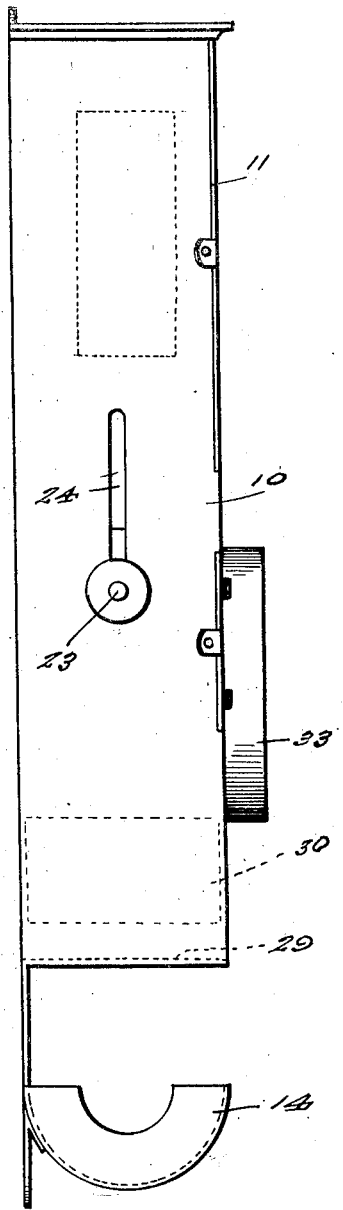
F. J. Hekrdle  INVENTOR
BY *Victor J. Evans*  ATTORNEY Oct. 21, 1924.  
F. J. HEKRDLE  
MATCH BOX  
Filed April 3, 1922   3 Sheets-Sheet 2

1,512,464

F. J. Hekrdle INVENTOR

BY *Victor J. Evans*
ATTORNEY

WITNESSES

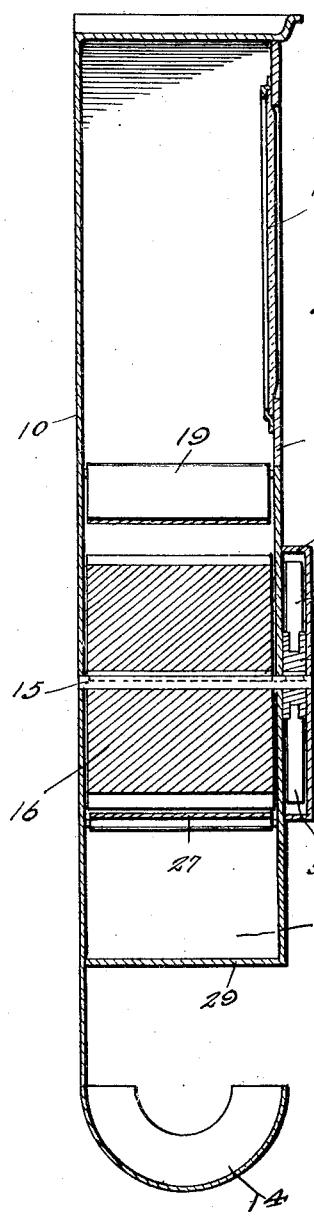
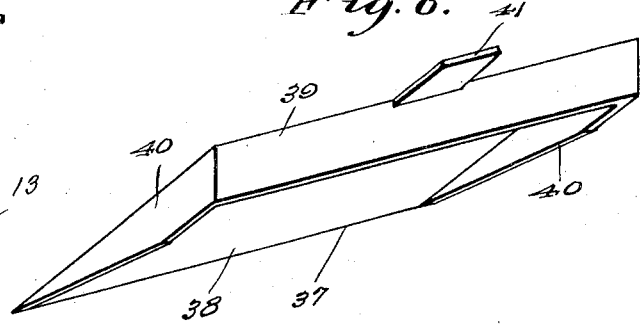
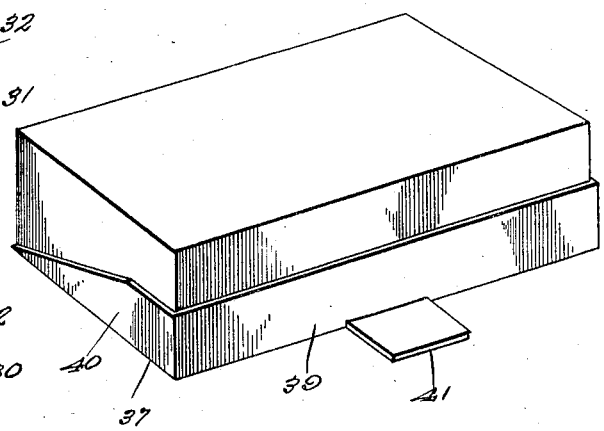

Patented Oct. 21, 1924.

1,512,464

UNITED STATES PATENT OFFICE.

FRANK J. HEKRDLE, OF DAVIDSON, SASKATCHEWAN, CANADA.

MATCH BOX.

Application filed April 3, 1922. Serial No. 549,293.

*To all whom it may concern:*

Be it known that I, FRANK J. HEKRDLE, a citizen of the Dominion of Canada, residing at Davidson, in the Province of Saskatchewan and Dominion of Canada, have invented new and useful Improvements in Match Boxes, of which the following is a specification.

This invention relates to improvements in match safes or receptacles and has for an object the provision of a receptacle which contains means for delivering matches singly therefrom.

Another object of the invention is the provision of novel means for filling the receptacle, so that the matches will be arranged in proper order to be discharged singly from the said receptacle and not become disarranged, so as to interfere with the proper operation of the delivering mechanism.

With the above and other objects in view, the invention further includes the following novel features and details of construction, to be hereinafter more fully described, illustrated in the accompanying drawings and pointed out in the appended claims.

In the drawings:—

Figure 1 is a front elevation of a match receptacle constructed in accordance with the invention.

Figure 2 is a side view of the same.

Figure 5 is a section on the line 5—5 of Figure 1.

Figure 6 is a detail view of the match box cover plate.

Figure 7 is a similar view showing the cover plate in position upon a box of matches, ready for insertion within the receptacle.

Figure 3:
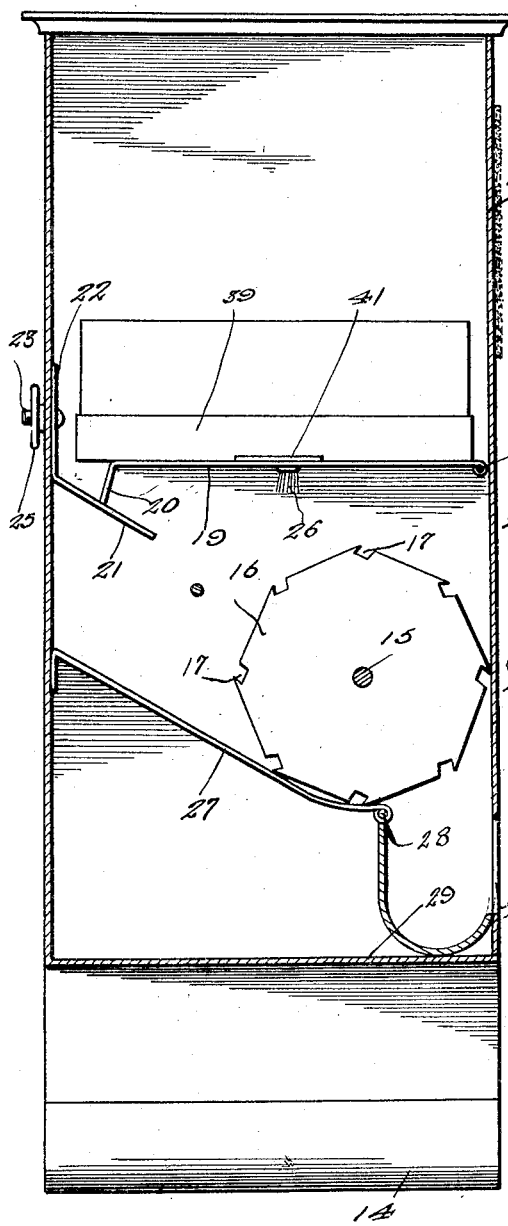
Figure 3 is a view with the front of the receptacle removed and illustrating the manner in which the matches are inserted within the receptacle.

Referring in detail to the drawings, wherein like characters of reference denote corresponding parts, the reference character 10 indicates a receptacle of suitable size and shape and constructed from any suitable material. This receptacle is provided with a door 11, which is hinged at 12, and which is preferably provided with a mirror 13, which serves both to ornament the receptacle and to provide for its use in the preparation of the toilet. As an aid to the last mentioned purpose, the receptacle has extending from its bottom a tray 14, which provides a comb and brush tray, or may be used for holding various other articles.

Rotatably mounted within the receptacle upon a shaft 15 is a cylinder 16 which is provided around its periphery with spaced match receiving pockets or grooves 17. These pockets or grooves have their opposite longitudinal walls inclined so as to more readily pick up and retain matches when the cylinder is rotated and to also conveniently discharge them.

Hingedly secured above the cylinder 16 as shown at 18, is one end of a tray 19, the opposite end of this tray being provided with an angularly disposed flange 20. This tray 19 is adapted to support a box of matches as the receptacle is being filled and for this purpose is supported in a substantially horizontal position through the medium of an adjustable shelf 21. The shelf 21 is inclined downwardly as shown and is provided with a vertical attaching flange 22 which carries a threaded stud 23. This stud 23 extends through a slot 24 provided in the side of the casing and is engaged by a hand nut or wheel 25, by means of which the shelf 21 is held in position. Secured to the lower face of the tray 19 is a brush 26, which is adapted to engage the periphery of the cylinder 16 so as to prevent the said cylinder from carrying more than a single match in each pocket.

Located beneath the cylinder 16 is a partition 27, one end of which is secured to the side wall of the receptacle 10. This partition terminates short of the opposite side wall, where it is secured upon a rod 28. The space between this end of the partition and the adjacent side wall forms a passage through which the matches pass to the bottom 29 of the receptacle. The front of the receptacle is provided with an opening 30, behind which the discharged match will fall to within convenient reach.

In order to rotate the cylinder 16, the shaft 15 has secured thereon upon the outside of the receptacle a wheel 31, from the hub of which extend spokes 32. This wheel is enclosed within a housing 33 secured to the front of the receptacle and this housing is cut away as shown at 34 so as to always expose one of the spokes of the wheel. The front of the receptacle is further provided with an opening which is closed by a door 35 and this door includes a glass or other transparent panel 36 which is so located as to expose to view that portion of the interior of the receptacle in which the matches are located.

Figure 4:
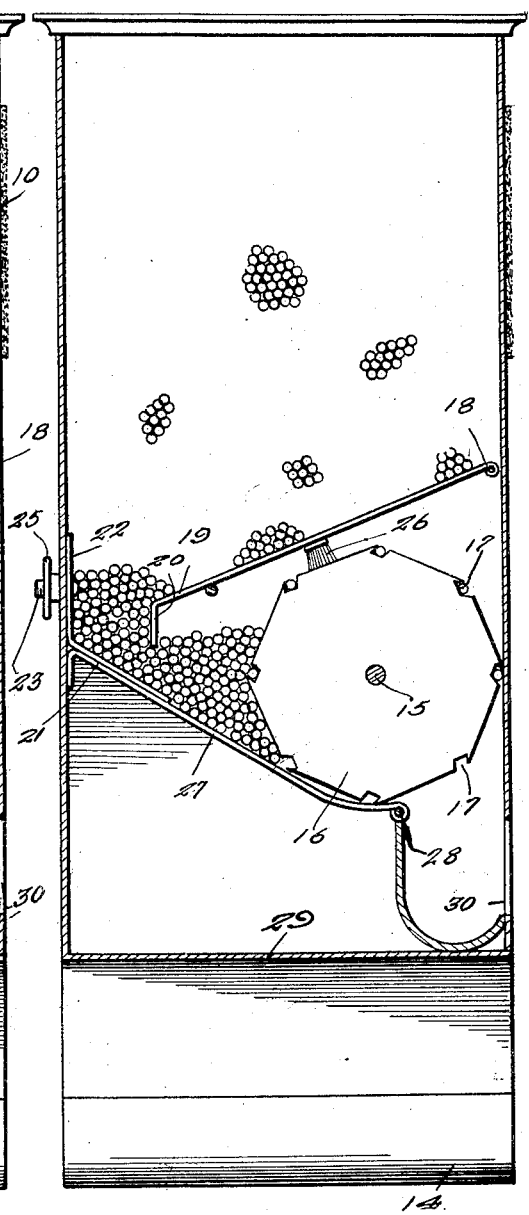
Figure 4 is a similar view showing the receptacle ready for operation.

After the receptacle has been filled, the matches occupy a position between the cylinder 16 and the opposite side wall and rest upon the partition 27, as will be seen from Figure 4 of the drawings. As the cylinder is revolved, the matches are picked up and retained within the pocket 17, the brush 26 which contacts with the periphery of the cylinder, preventing more than a single match being retained in each pocket. The cylinder is rotated through the medium of the wheel 31 and the casing or housing within which this wheel operates has its cut away portion 34 so proportioned, that the wheel will be rotated the distance equal to the distance between two spokes, at each operation of the machine.

One of the novel features of the invention resides in the provision of means for filling the receptacle. For this purpose, the matches are placed within the receptacle through the medium of the box in which they are originally sold. As well known, the matches are packed within these boxes in regular order and in order to deposit them in the receptacle in the same manner, the lid is removed from the box and a lid 37 substituted. This lid is shown in detail in Figure 6 of the drawings and comprises a top 38, a side flange 39 and end flanges 40. A finger piece 41 preferably projects from one side edge of the lid for convenience in handling. When it is desired to fill the receptacle, the lid 37 is placed over the top of a box of matches and the latter is then inverted to the position shown in Figure 7 of the drawings. The shelf 21 is then raised by loosening the nut 25 and the tray 19 is elevated so as to provide a shelf upon which the inverted box of matches is placed, as shown in Figure 3 of the drawings. The cover 37 is then pulled from beneath the box of matches and the tray 19 and shelf 21 lowered to the position shown in Figure 4 of the drawings, whereupon the matches will drop downward and rest upon the partition 27. One or more boxes of matches may be placed within the receptacle, according to the size of the latter.

The invention is susceptible of various changes in its form, proportions and minor details of construction and the right is herein reserved to make such changes as properly fall within the scope of the appended claims.

Having described the invention what is claimed is:—

1. A match receptacle comprising a casing, means located within the casing for delivering a match singly therefrom, means whereby the match delivering means may be operated and means for arranging the matches in regular order within the receptacle, said means including a match box supporting tray and adjustable means for holding the tray in position.

2. A match receptacle comprising a casing, means located within the casing for delivering a match singly therefrom, means whereby the match delivering means may be operated and means for arranging the matches in regular order within the receptacle, said means including a hinged match box supporting tray and movable means for holding the tray in position.

3. A match receptacle comprising a casing, means located within the casing for delivering a match singly therefrom, means whereby the match delivering means may be operated and means for arranging the matches in regular order within the receptacle, said means including a hinged match box supporting tray and a vertically adjustable shelf adapted to be positioned in the path of movement of the tray for holding the latter in adjusted position.

4. A match receptacle comprising a casing, means located within the casing for delivering a match singly therefrom, means whereby the match delivering means may be operated and means for arranging the matches in regular order within the receptacle, said means including a hinged match box supporting tray and a vertically adjustable shelf adapted to be positioned in the path of movement of the tray for holding the latter in adjusted position and a slidingly movable member adapted to rest upon the tray to receive an inverted box of matches.

5. A match receptacle comprising a casing, means for delivering matches therefrom and means for filling and arranging the matches within the casing, said means including a match box receiving tray adapted for insertion within the casing and means whereby the tray may be slid from beneath the box to release the matches.

In testimony whereof I affix my signature.

FRANK J. HEKRDLE.